United States Patent
Yokoyama et al.

(10) Patent No.: US 12,141,607 B2
(45) Date of Patent: Nov. 12, 2024

(54) MACHINE LEARNING DEVICE

(71) Applicant: TOYOTA JIDOSHA KABUSHIKI KAISHA, Aichi-ken (JP)

(72) Inventors: Daiki Yokoyama, Gotemba (JP); Norimi Asahara, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 708 days.

(21) Appl. No.: 17/348,768

(22) Filed: Jun. 16, 2021

(65) Prior Publication Data
US 2021/0397477 A1    Dec. 23, 2021

(30) Foreign Application Priority Data

Jun. 18, 2020  (JP) .................. 2020-105302
Feb. 26, 2021  (JP) .................. 2021-030421

(51) Int. Cl.
*G06F 9/48*  (2006.01)
*G06F 9/50*  (2006.01)
*G06F 18/214*  (2023.01)
*G06N 20/00*  (2019.01)
*G06V 20/56*  (2022.01)

(52) U.S. Cl.
CPC .......... *G06F 9/4893* (2013.01); *G06F 9/5094* (2013.01); *G06F 18/214* (2023.01); *G06N 20/00* (2019.01); *G06V 20/56* (2022.01)

(58) Field of Classification Search
CPC .... G06F 9/4893; G06F 18/214; G06F 9/5094; G06N 20/00; G06V 20/56
See application file for complete search history.

(56) References Cited

U.S. PATENT DOCUMENTS 8,909,950  B1 *  12/2014  Levchuk ................ G06N 20/00
                                              455/418
2016/0328661  A1 *  11/2016  Reese .................... G06N 3/044
2018/0367484  A1 *  12/2018  Rodriguez ............. H04L 51/10
2019/0311262  A1    10/2019  Nagasaka et al.
(Continued)

FOREIGN PATENT DOCUMENTS

CN        111114466 A       5/2020
JP        2004-268529 A     9/2004
(Continued)

OTHER PUBLICATIONS

Lopez, Karol Lina. A Machine Learning Approach for the Smart Charging of Electric Vehicles. [online]. Universite Laval., pp. 1-119. Retrieved From the Internet <https://dam-oclc.bac-lac.gc.ca/download?is_thesis=1&oclc_number=1132194635&id=fa16dd65-15ef-4384-b9f2-499014e5af2f&fileName=34811.pdf> (Year: 2019).*

(Continued)

*Primary Examiner* — Qamrun Nahar
*Assistant Examiner* — Jonathan R Labud
(74) *Attorney, Agent, or Firm* — HAUPTMAN HAM, LLP

(57) ABSTRACT

A machine learning device is provided in a vehicle able to supply electric power to an outside, and includes a processor configured to perform processing relating to training a machine learning model used in the vehicle. The processor is configured to lower an electric power consumption amount in the processing relating to training when acquiring disaster information compared with when not acquiring the disaster information.

7 Claims, 13 Drawing Sheets

(56) References Cited

U.S. PATENT DOCUMENTS

| | | |
|---|---|---|
| 2020/0125042 A1 | 4/2020 | Oyagi et al. |
| 2020/0130669 A1 | 4/2020 | Tsuchiya et al. |
| 2020/0132011 A1 | 4/2020 | Kitagawa et al. |
| 2020/0142409 A1* | 5/2020 | Valois ................... G05D 1/0246 |
| 2020/0364471 A1* | 11/2020 | Park ....................... G06T 7/0002 |
| 2021/0097335 A1* | 4/2021 | Scriven ................... G06F 40/30 |
| 2021/0103458 A1* | 4/2021 | Manousakis .......... G06F 9/5077 |
| 2021/0190877 A1 | 6/2021 | Isa et al. |
| 2022/0250498 A1* | 8/2022 | Okada ................... H02J 7/0048 |
| 2022/0292368 A1* | 9/2022 | Takimoto ............... G06N 3/045 |

FOREIGN PATENT DOCUMENTS

| | | |
|---|---|---|
| JP | 2009-280139 A | 12/2009 |
| JP | 2017-73915 A | 4/2017 |
| JP | 2019-161687 A | 9/2019 |
| JP | 2019183698 A | 10/2019 |
| JP | 2020-67762 A | 4/2020 |
| JP | 2020-67911 A | 4/2020 |
| WO | 2013/154093 A1 | 10/2013 |
| WO | 2019/097357 A1 | 5/2019 |

OTHER PUBLICATIONS

Krueger et al. Multi-Layer Event-Based Vehicle-to-Grid (V2G) Scheduling With Short Term Predictive Capability Within a Modular Aggregator Control Structure. [online] (May 5). IEEE., pp. 4727-4739. Retrieved From the Internet (Year: 2020).*

Kumaravelan, Priyadharshini Modeling Power Grid Recovery and Resilience Post Extreme Weather Events. [online] (Dec. 2019). Texas State University., pp. 1-98. Retrieved From the Internet (Year: 2019).*

Mroczek et al. The V2G Process With the Predictive Model. [online] (Apr. 25). IEEE., pp. 86947-86956. Retrieved From the Internet (Year: 2020).*

* cited by examiner

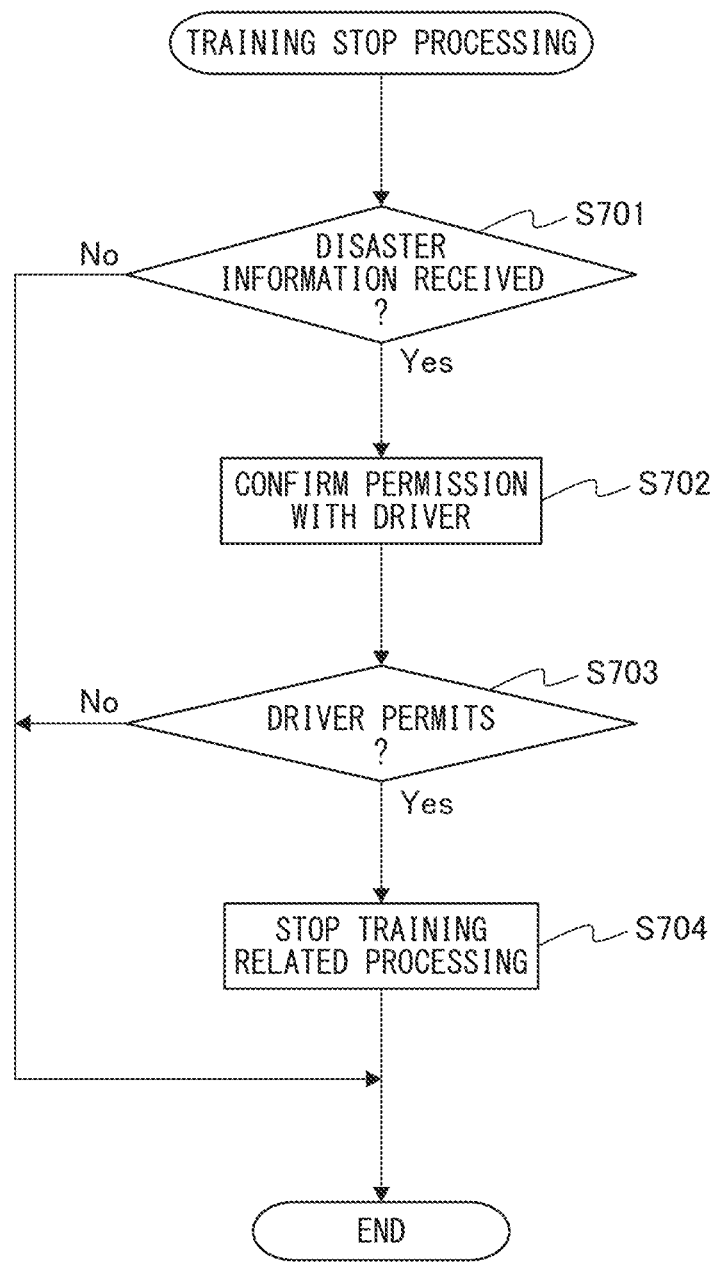

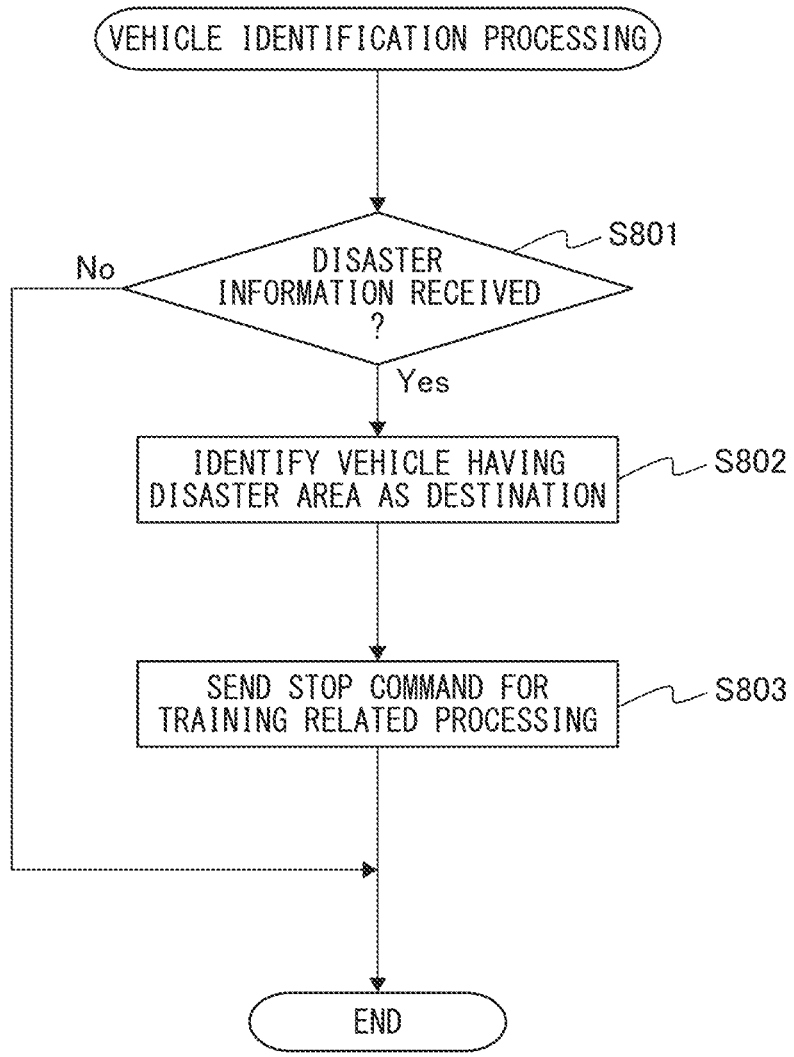

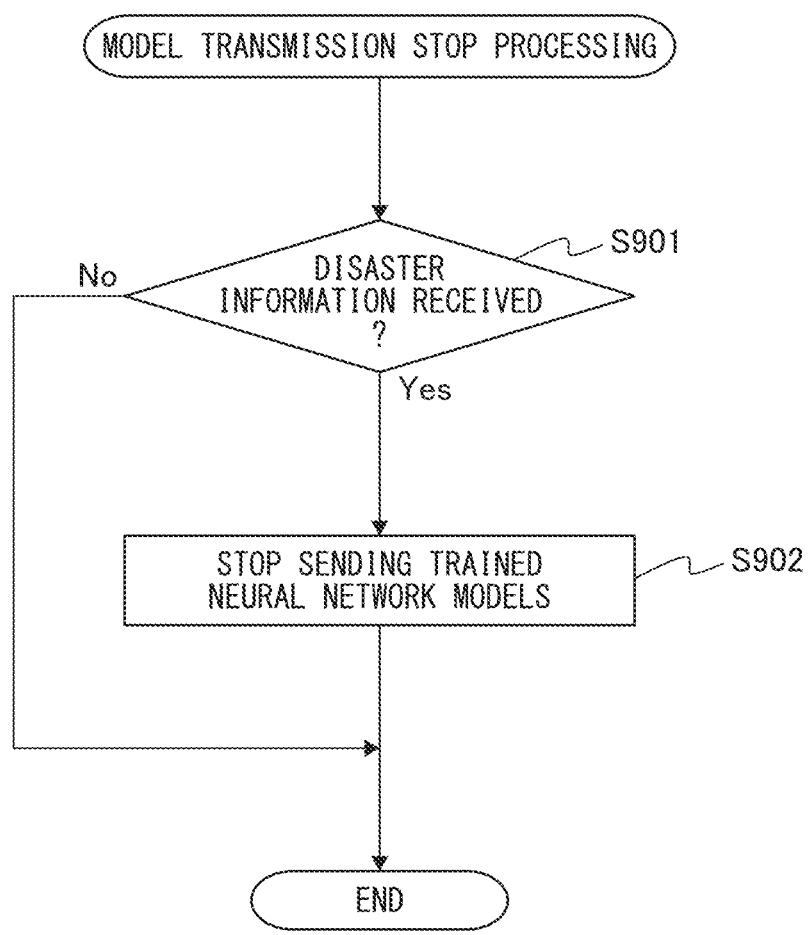

MACHINE LEARNING DEVICE

FIELD

The present disclosure relates to a machine learning device.

BACKGROUND

In recent years, along with the developments in AI (artificial intelligence), in vehicles, control using a machine learning model such as a neutral network model is being studied. For example, in the machine learning device described in PTL 1, an electronic control unit provided in the vehicle is used to train a neutral network model, and an estimated value of temperature of an exhaust purification catalyst is output from the trained neutral network model.

CITATIONS LIST

Patent Literature

[PTL 1] Japanese Unexamined Patent Publication No. 2019-183698

SUMMARY

Technical Problem

In this regard, in a vehicle with a large battery capacity such as a plug-in hybrid vehicle (PHV), electric power stored in the battery can be supplied to the outside of the vehicle. For this reason, when a disaster causes a power outage, such a vehicle can be effectively utilized as a source of supply of electric power.

However, if processing relating to training of a machine learning model is performed in a vehicle, electric power required for training is consumed in addition to the electric power required for driving the vehicle. As a result, the amount of electric power consumed in the vehicle increases and the electric power required at the time of a disaster is liable to unable to be secured.

Therefore, in consideration of the above problem, an object of the present disclosure is to keep the amount of electric power which can be supplied to the outside from a vehicle at the time of a disaster from decreasing due to processing relating to training of a machine learning model in the vehicle able to supply electric power to the outside.

Solution to Problem

The summary of the present disclosure is as follows.

(1) A machine learning device provided in a vehicle able to supply electric power to an outside, comprising a processor configured to perform processing relating to training a machine learning model used in the vehicle, wherein the processor is configured to lower an electric power consumption amount in the processing relating to training when acquiring disaster information compared with when not acquiring the disaster information.

(2) The machine learning device described in above (1), wherein the processor is configured to acquire position information of the vehicle, and the processor is configured to lower the electric power consumption amount in the processing relating to training when supply of electric power from the vehicle to the outside is anticipated based on the disaster information and the position information compared to when the supply of electric power is not anticipated.

(3) The machine learning device described in above (2), wherein the processor is configured to acquire a destination of the vehicle, and the processor is configured to lower the electric power consumption amount when supply of electric power from the vehicle to the outside is anticipated based on the disaster information and the destination compared to when the supply of electric power is not anticipated.

(4) The machine learning device described in any one of above (1) to (3), wherein the processor is configured to lower the electric power consumption amount by stopping the processing relating to training.

(5) The machine learning device described in above (4), wherein the processor is configured to control an output device provided at the vehicle, the processor is configured to confirm permission for stopping the processing relating to training with the driver of the vehicle through the output device, and the processor is configured not to stop the processing relating to training when the driver does not permit stopping of the processing relating to training.

(6) A machine learning device comprising: a communication device able to communicate with a vehicle able to supply electric power to an outside; and a processor configured to train a machine learning model and transmitting a trained machine learning model through the communication device to the vehicle, wherein the processor is configured to stop the transmission to the vehicle of the trained machine learning model when acquiring disaster information.

Advantageous Effects of Invention

According to the present disclosure, it is possible to keep the amount of electric power which can be supplied to the outside from a vehicle at the time of a disaster from decreasing due to processing relating to training of a machine learning model in the vehicle able to supply electric power to the outside.

BRIEF DESCRIPTION OF DRAWINGS

FIG. 14 is a flow chart showing a control routine of training stop processing in the fifth embodiment of the present disclosure.

FIG. 15 is a flow chart showing a control routine of vehicle identification processing in a sixth embodiment of the present disclosure.

FIG. 16 is a flow chart showing a control routine of model transmission stop processing in a seventh embodiment of the present disclosure.

DESCRIPTION OF EMBODIMENTS

Figure 1:
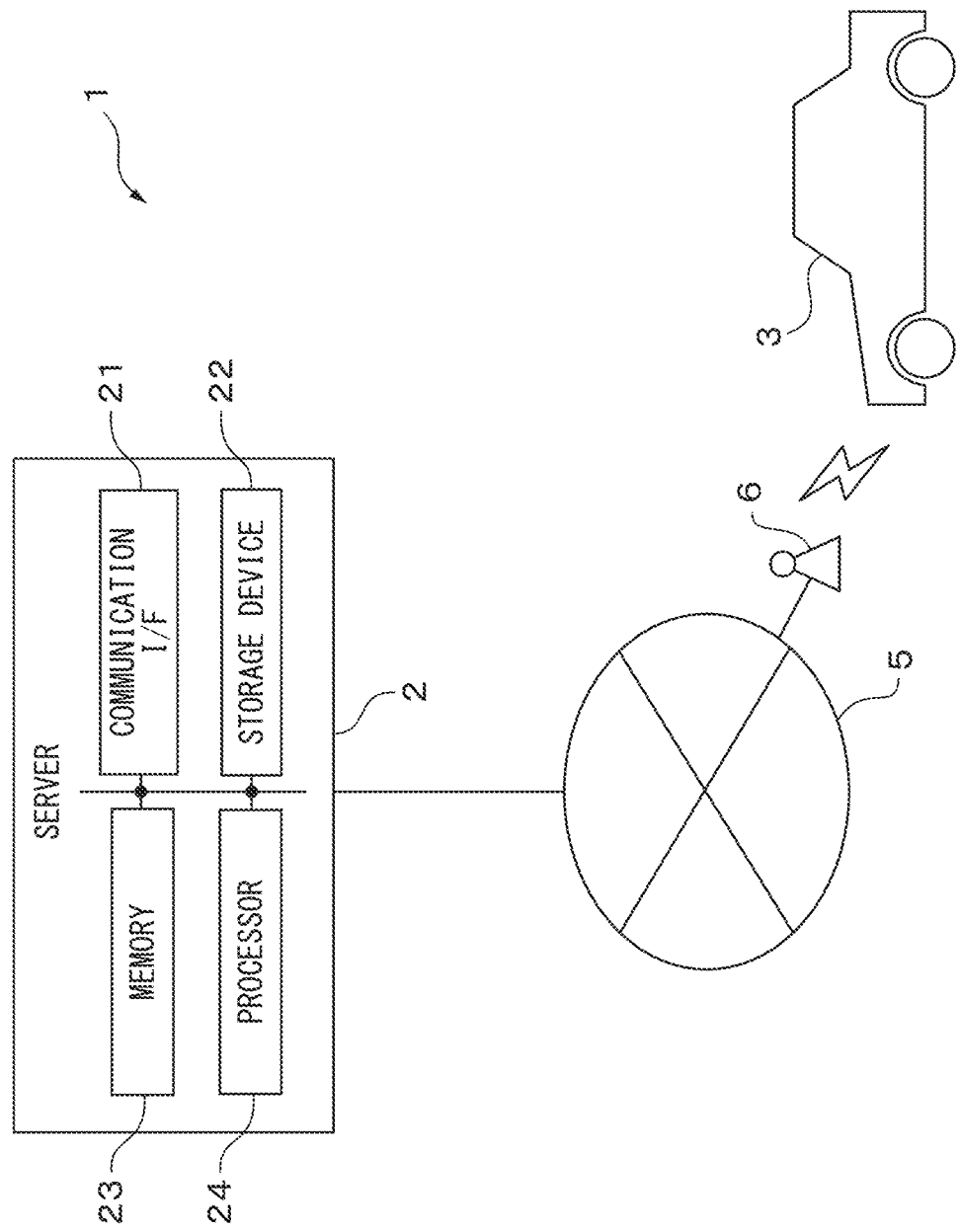
FIG. 1 is a schematic view of the configuration of a machine learning system according to a first embodiment of the present disclosure.

Below, referring to the drawings, embodiments of the present disclosure will be explained in detail. Note that, in the following explanation, similar component elements are assigned the same reference signs.

First Embodiment

First, referring to FIG. 1 to FIG. 6, a first embodiment of the present disclosure will be explained. FIG. 1 is a schematic view of a configuration of a machine learning system 1 according to the first embodiment of the present disclosure. The machine learning system 1 is provided with a server 2 and a vehicle 3.

As shown in FIG. 1, the server 2 is provided outside of the vehicle 3 and is provided with a communication interface 21, a storage device 22, a memory 23, and a processor 24. Note that, the server 2 may be further provided with an input device such as a keyboard and mouse and an output device such as a display etc. Further, the server 2 may be configured by a plurality of computers.

The communication interface 21 can communicate with the vehicle 3 and enables the server 2 to communicate with the vehicle 3. Specifically, the communication interface 21 has an interface circuit for connecting the server 2 to the communication network 5. The server 2 communicates with the vehicle 3 through the communication interface 21, the communication network 5, and the wireless base station 6. The communication interface 21 is one example of a communication device.

The storage device 22, for example, has a hard disk drive (HDD), solid state drive (SSD), or optical storage medium. The storage device 22 stores various types of data, for example, stores information relating to the vehicle 3, computer programs for the processor 24 to perform various processing, etc.

The memory 23, for example, has a semiconductor memory such as a random access memory (RAM). The memory 23, for example, stores various data etc., used when various processing is performed by the processor 24.

The communication interface 21, storage device 22, and memory 23 are connected through signal wires to the processor 24. The processor 24 has one or more CPUs and peripheral circuits and performs various processing. Note that, the processor 24 may further have processing circuits such as arithmetic logic units or numerical calculation units. The processor 24 is an example of a control device.

Figure 2:
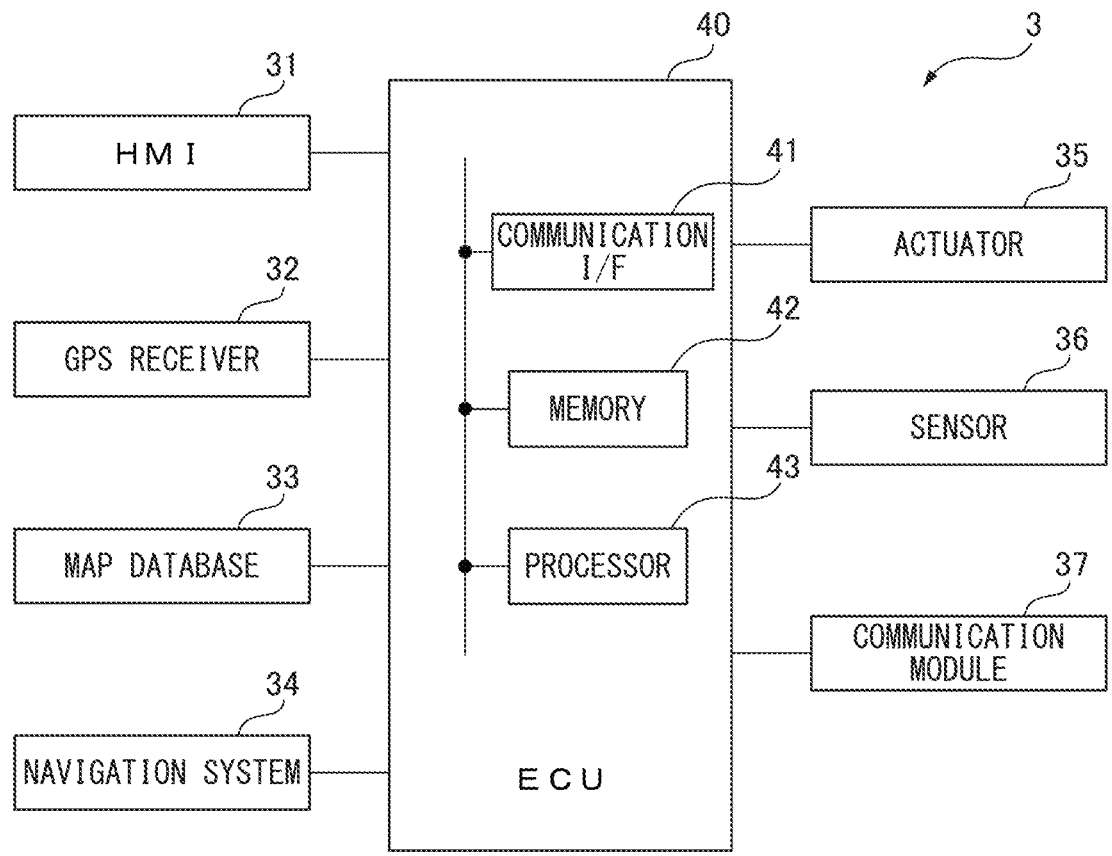
FIG. 2 is view schematically showing the configuration of a vehicle in which a machine learning device according to the first embodiment of the present disclosure is provided.

FIG. 2 is view schematically showing the configuration of a vehicle 3 in which a machine learning device according to the first embodiment of the present disclosure is provided. The vehicle 3 is a vehicle able to supply electric power to the outside of the vehicle 3. For example, it is a plug-in hybrid vehicle (PHV), an electric vehicle (EV), a fuel cell vehicle (FCV), etc.

As shown in FIG. 2, the vehicle 3 is provided with a human machine interface (HMI) 31, a GPS receiver 32, a map database 33, a navigation system 34, an actuator 35, a sensor 36, a communication module 37, and an electronic control unit (ECU) 40. The HMI 31, the GPS receiver 32, the map database 33, the navigation system 34, the actuator 35, the sensor 36, and the communication module 37 are connected to be able to communicate with the ECU 40 through an internal vehicle network based on the CAN (Controller Area Network) or other standard.

The HMI 31 is an input/output device for input and output of information between the driver and vehicle 3. The HMI 31, for example, includes a display for showing information, a speaker generating sound, operating buttons or a touch screen for the driver to input information, a microphone for receiving the voice of the driver, etc. The output of the ECU 40 is transmitted to the driver through the HMI 31. The input from the driver is transmitted through the HMI 31 to the ECU 40.

The GPS receiver 32 receives signals from three or more GPS satellites and detects the current position of the vehicle 3 (for example, the latitude and longitude of the vehicle 3). The output of the GPS receiver 32 is transmitted to the ECU 40.

The map database 33 stores map information. The ECU 40 acquires map information from the map database 33.

The navigation system 34 sets the driving route of the vehicle to the destination based on the current position of the vehicle detected by the GPS receiver 32, map information of the map database 33, input by the driver of the vehicle, etc. The driving route set by the navigation system 34 is transmitted to the ECU 40. Note that, the GPS receiver 32 and the map database 33 may be incorporated in the navigation system 34

The actuator 35 is an actuating part required for driving the vehicle 3. If the vehicle 3 is a PHV, the actuator 35, for example, includes a motor, a fuel injector, a spark plug, a throttle valve drive actuator, an EGR control valve, etc. The ECU 40 controls the actuator 35.

The sensor 36 detects the state quantity of the vehicle 3, the internal combustion engine, the battery, etc. and includes a vehicle speed sensor, an accelerator opening degree sensor, an air flow meter, an air-fuel ratio sensor, a crank angle sensor, a torque sensor, a voltage sensor, etc. The output of the sensor 36 is sent to the ECU 40.

The communication module 37 is a device which enables communicate between the vehicle 3 and the outside of the vehicle 3. The communication module 37, for example, is a data communication module (DCM) able to communicate with a communication network 5 through a wireless base station 6. Note that, a mobile terminal (for example, a smartphone, tablet terminal, WiFi router, etc.) may be used as the communication module 37.

The ECU 40 includes a communication interface 41, a memory 42, and a processor 43 and performs various control operations of the vehicle 3. Note that, in the present embodiment, a single ECU 40 is provided, but a plurality of ECUs may be provided for the different functions.

The communication interface 41 is an interface circuit for connecting the ECU 40 to an internal vehicle network based on the CAN or other standard. The ECU 40 communicates with other vehicle-mounted devices as described above through the communication interface 41.

The memory 42, for example, has a volatile semiconductor memory (for example, a RAM) and a nonvolatile semiconductor memory (for example, a ROM). The memory 42 stores programs run by the processor 43, various data used when the various processings are performed in the processor 43, etc.

The processor 43 has one or more CPUs (central processing units) and their peripheral circuits and performs various processing. Note that, the processor 43 may further have processing circuits such as arithmetic logic units or numerical calculation units. The communication interface 41, the memory 42 and the processor 43 are connected to each other through signal wires.

Figure 3:
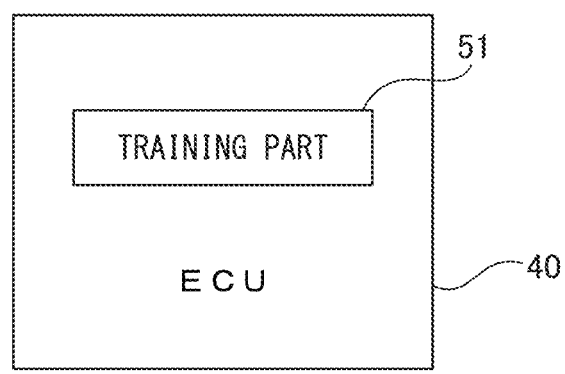
FIG. 3 is a functional block diagram of an ECU in a first embodiment.

In the present disclosure, the ECU 40 functions as a machine learning device. FIG. 3 is a functional block diagram of the ECU 40 in the first embodiment. The ECU 40 has a training part 51. The training part 51 is a functional block realized by the processor 43 of the ECU 40 running programs stored in the memory 42 of the ECU 40.

Figure 4:
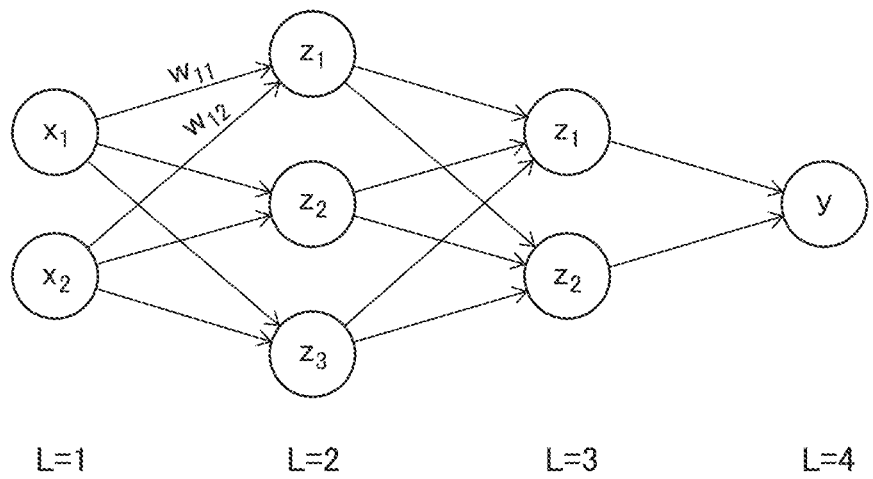
FIG. 4 shows one example of a neutral network model having a simple configuration.

The training part 51 performs processing relating to training a machine learning model used in the vehicle 3. In the present embodiment, a neural network model is used as a machine learning model, and the training part 51 performs processing relating to training a neural network model. First, referring to FIG. 4, a neural network model will be explained in outline. FIG. 4 shows one example of a neural network model having a simple configuration.

The circle marks in FIG. 4 show artificial neurons. An artificial neuron is usually called a "node" or "unit" (in this Description, called a "node"). In FIG. 4, L=1 indicates an input layer, L=2 and L=3 indicate hidden layers, and L=4 indicates an output layer. Note that, the hidden layers are also called "intermediate layers".

In FIG. 4, $x_1$ and $x_2$ indicate nodes of the input layer (L=1) and output values from the nodes, while "y" indicates a node of the output layer (L=4) and its output values. Similarly, the $z_1^{(L=2)}$, $z_2^{(L=2)}$, and $z_3^{(L=2)}$ indicates nodes of the hidden layers (L=2) and the output values from the nodes, while $z_1^{(L=3)}$ and $z_2^{(L=3)}$ indicate nodes of the hidden layers (L=3) and the output values from the nodes.

At the nodes of the input layer, inputs are output as they are. On the other hand, at the nodes of the hidden layer (L=2), the output values $x_1$ and $x_2$ of the nodes of the input layer are input. At the nodes of the hidden layers (L=2), corresponding weights "w" and biases "b" are used to calculate total input values "u". For example, in FIG. 4, the total input values $u_k^{(L=2)}$ calculated at the nodes shown by $z_k^{(L=2)}$ (k=1, 2, 3) of the hidden layer (L=2) become as in the following equation (M is the number of nodes of the input layer).

$$u_k^{(L=2)} = \sum_{m=1}^{N} \left( x_m \cdot w_{km}^{(L=2)} \right) + b_k \quad \text{[Equation 1]}$$

Next, this total input values $u_k^{(L=2)}$ are converted by the activation function "f" and are output as the output values $z_k^{(L=2)}$ (=$f(u_k^{(L=2)})$) from the nodes shown by $z_k^{(L=2)}$ of the hidden layers (L=2). On the other hand, the nodes of the hidden layer (L=3) receive as input the output values $z_1^{(L=2)}$, $z_2^{(L=2)}$, and $z_3^{(L=2)}$ of the nodes of the hidden layer (L=2). At the nodes of the hidden layer (L=3), the corresponding weights "w" and biases "b" are used to calculate the total input values "u" (=Σz·w+b). The total input values "u" are similarly converted by an activation function and are output from the nodes of the hidden layers (L=3) as the output values $z_1^{(L=3)}$ and $z_2^{(L=2)}$. The activation function is for example a Sigmoid function a.

Further, the node of the output layer (L=4) receives as input the output values $z_1^{(L=3)}$ and $z_2^{(L=3)}$ of the nodes of the hidden layer (L=3). At the node of the output layer, the corresponding weights "w" and biases "b" are used to calculate the total input value "u" (Σz·w+b) or only the corresponding weights "w" are used to calculate the total input value "u" (Σz·w). For example, at the node of the output layer, an identity function is used as the activation function. In this case, the total input value "u" calculated at the node of the output layer is output as it is as the output value "y" from the node of the output layer.

The neutral network model used in the vehicle 3 is stored in a memory 42 of the ECU 40 or other storage device provided in the vehicle 3. The ECU 40 inputs a plurality of input parameters to the neutral network model to make the neutral network model output at least one output parameter. At this time, as the values of the input parameters, for example, values detected by the sensor 36 etc., or values calculated in the ECU 40 are used. By using the neutral network model, it is possible to obtain a suitable value of an output parameter corresponding to predetermined values of input parameters.

In order to improve the accuracy of the neutral network model, it is necessary to train the neutral network model in advance. In the present embodiment, the ECU 40 of the vehicle 3 trains the neutral network model. That is, the neutral network model is trained in the vehicle 3 rather than the server 2.

In the training of the neutral network model, training data sets comprised of measured values of a plurality of input parameters and measured values (truth data) of at least one output parameter corresponding to these measured values are used. For this reason, the training part 51 of the ECU 40 prepares training data sets as processing relating to training of the neutral network model (below, referred to as "training related processing"). Specifically, the training part 51 acquires measured values of a plurality of input parameters and the measured value of at least one output parameter corresponding to these measured values, and prepares a training data set by combining the measured values of the input parameters and output parameter.

The measured values of the input parameters and the output parameters are, for example, acquired as values detected by the sensor 36 etc., or values calculated or determined at the ECU 40. The training data sets prepared by the training part 51 are stored in the memory 42 of the ECU 40 or other storage device provided at the vehicle 3. Note that, the measured values of the input parameters used as the training data set may be normalized or standardized.

Further, the training part 51 trains the neutral network model as training related processing. Specifically, the training part 51 uses a large number of training data sets and repeatedly updates the weights "w" and biases "b" in the neural network model by the known error backpropagation method so that the differences of the output values of the neutral network model and the measured values of the output parameters become smaller. As a result, the neutral network model is trained and a trained neutral network model is produced. The information (structure, weights "w", biases "b", etc., of the model) of the trained neutral network model is stored in the memory 42 of the ECU 40 or other storage device provided at the vehicle 3. By using the neutral network model trained at the vehicle 3, it is possible to predict the value of an output parameter corresponding to predetermined values of input parameters without detecting the actual value of the output parameter by the sensor 36 etc.

In this regard, as explained above, in the vehicle 3, the electric power stored at the battery of the vehicle 3 can be supplied to the outside of the vehicle 3. For this reason, when a disaster causes a power outage, the vehicle 3 can be effectively used as a source of electric power.

However, if training related processing is performed at the vehicle 3, electric power required for training is consumed in addition to the electric power required for driving the vehicle 3. As a result, the amount of electric power consumed at the vehicle 3 increases and the electric power required at the time of a disaster is liable to be unable to be secured.

For this reason, in the present embodiment, the training part 51 lowers the amount of electric power consumed in the training relating processing when acquiring disaster information compared with when not acquiring disaster information. By doing this, it is possible to keep the amount of electric power able to be supplied to the outside from the vehicle 3 at the time of a disaster from decreasing due to training related processing.

Disaster information includes information relating to natural disasters (earthquakes, hurricanes, volcanic eruptions, floods, etc.) and manmade disasters (power outages due to mistakes in construction etc.) For example, the training part 51 receives disaster information from the outside of the vehicle 3 to thereby acquire disaster information. In this case, the server 2 receives disaster information from public institutions (Meteorological Agency, Ministry of Land, Infrastructure, Transport and Tourism, etc.), electric power companies, etc., and transmits the disaster information to the vehicle 3.

On the other hand, when the training part 51 of the ECU 40 receives disaster information from the server 2, it stops the training related processing. That is, the training part 51 stops the training related processing to thereby lower the amount of electric power consumed in the training related processing (rendering it zero).

Figure 5:
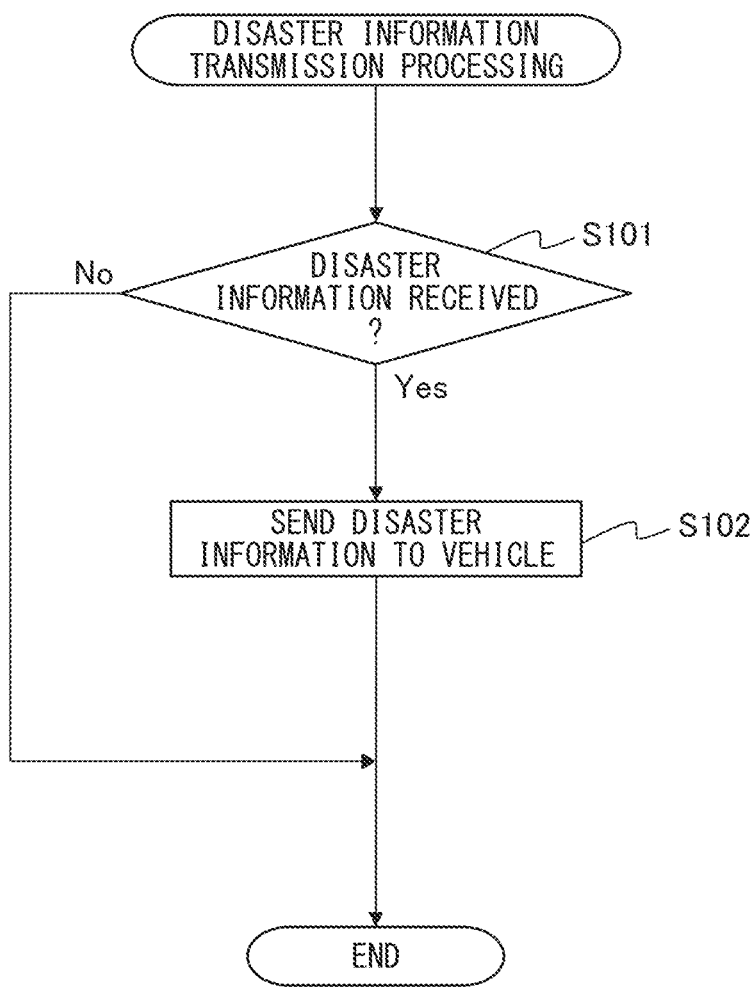
FIG. 5 is a flow chart showing a control routine of disaster information transmission processing in the first embodiment of the present disclosure.

Below, the flow charts of FIG. 5 and FIG. 6 will be used to explain the above-mentioned control. FIG. 5 is a flow chart showing the control routine of the disaster information transmission processing in the first embodiment of the present disclosure. The present control routine is repeatedly performed at predetermined intervals by the processor 24 of the server 2.

First, at step S101, the processor 24 judges whether it has received disaster information. If it is judged that disaster information has not been received, the present control routine ends. On the other hand, if it is judged that disaster information has been received, the control routine proceeds to step S102.

At step S102, the processor 24 transmits the disaster information to the vehicle 3. After step S102, the present control routine ends.

Note that, the disaster information may be input to the server 2 by the operator of the server 2 etc., and at step S101, the processor 24 may judge whether disaster information has been input to the server 2.

Figure 6:
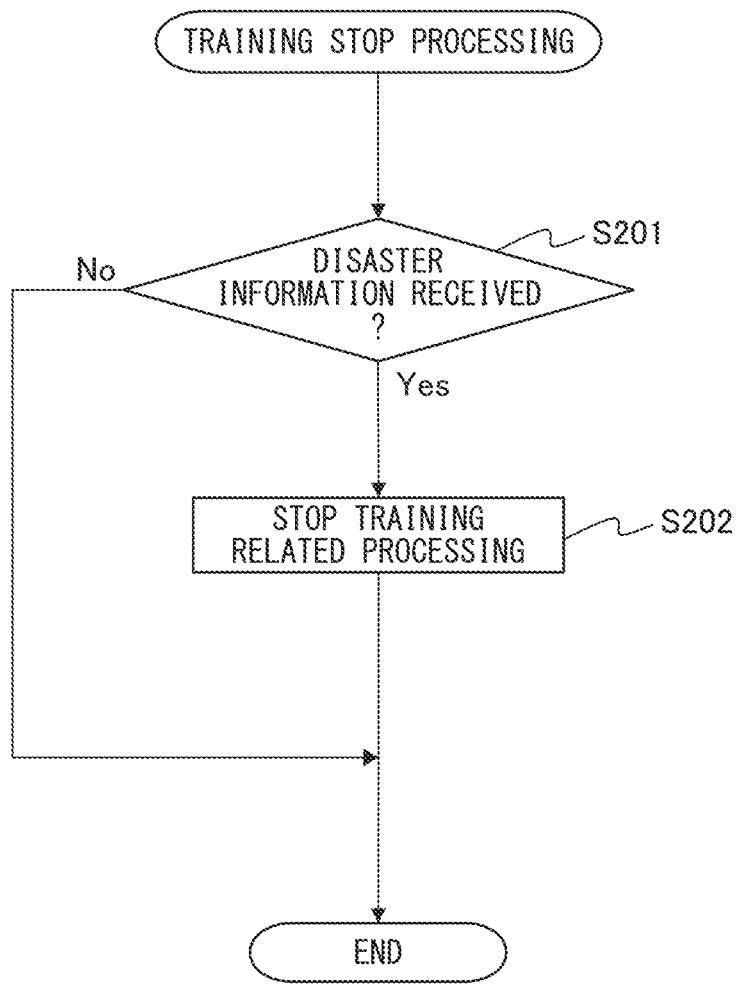
FIG. 6 is a flow chart showing a control routine of training stop processing in the first embodiment of the present disclosure.

FIG. 6 is a flow chart showing a control routine of training stop processing in the first embodiment of the present disclosure. The present control routine is repeatedly performed at predetermined intervals by the ECU 40 of the vehicle 3.

First, at step S201, the training part 51 judges whether disaster information has been received from the server 2. If it is judged that disaster information has not been received from the server 2, the present control routine ends. On the other hand, if it is judged that disaster information has been received from the server 2, the control routine proceeds to step S202.

At step S202, the training part 51 stops the training related processing. Specifically, the training part 51 stops the preparation of the training data sets and the training of the neutral network model. At this time, the fact that the training related processing was stopped for keeping down the electric power consumption may be notified to the driver by text or voice through the HMI 31. After step S202, the present control routine ends. In this case, the training part 51, for example, resumes the training related processing when a predetermined time has elapsed, when the vehicle 3 is restarted, when the driver of the vehicle 3 instructs resumption of the training related processing through the HMI 31, or when the server 2 notifies the end of the state of disaster.

Note that, since among the training related processing, the amount of power consumption for training the neutral network model becomes maximum, at step S202, the training part 51 may stop only training of the neutral network model.

Further, the training part 51 may lower the amount of electric power consumed in the training related processing without stopping the training related processing. In this case, the training part 51, for example, reduces the frequency of preparation of training data sets, reduces the frequency of training of the neutral network model, or slows down the training speed of the neutral network model to thereby lower the amount of electric power consumed.

Further, the training part 51 may directly receive disaster information from public institutions (Meteorological Agency, Ministry of Land, Infrastructure, Transport and Tourism, etc.), electric power companies, etc., without going through the server 2. Further, the training part 51 may use a communication module 37 to receive disaster information from other vehicles by vehicle-to-vehicle communication or acquire disaster information from road side devices by road-to-vehicle communication. In these cases, the control routine of FIG. 5 is omitted and, at step S201, the training part 51 judges whether it has received disaster information.

Second Embodiment

The configuration and control of the machine learning device according to the second embodiment are basically similar to the configuration and control of the machine learning device according to the first embodiment except for the points explained below. For this reason, below, the second embodiment of the present disclosure will be explained focusing on parts different from the first embodiment.

Figure 7:
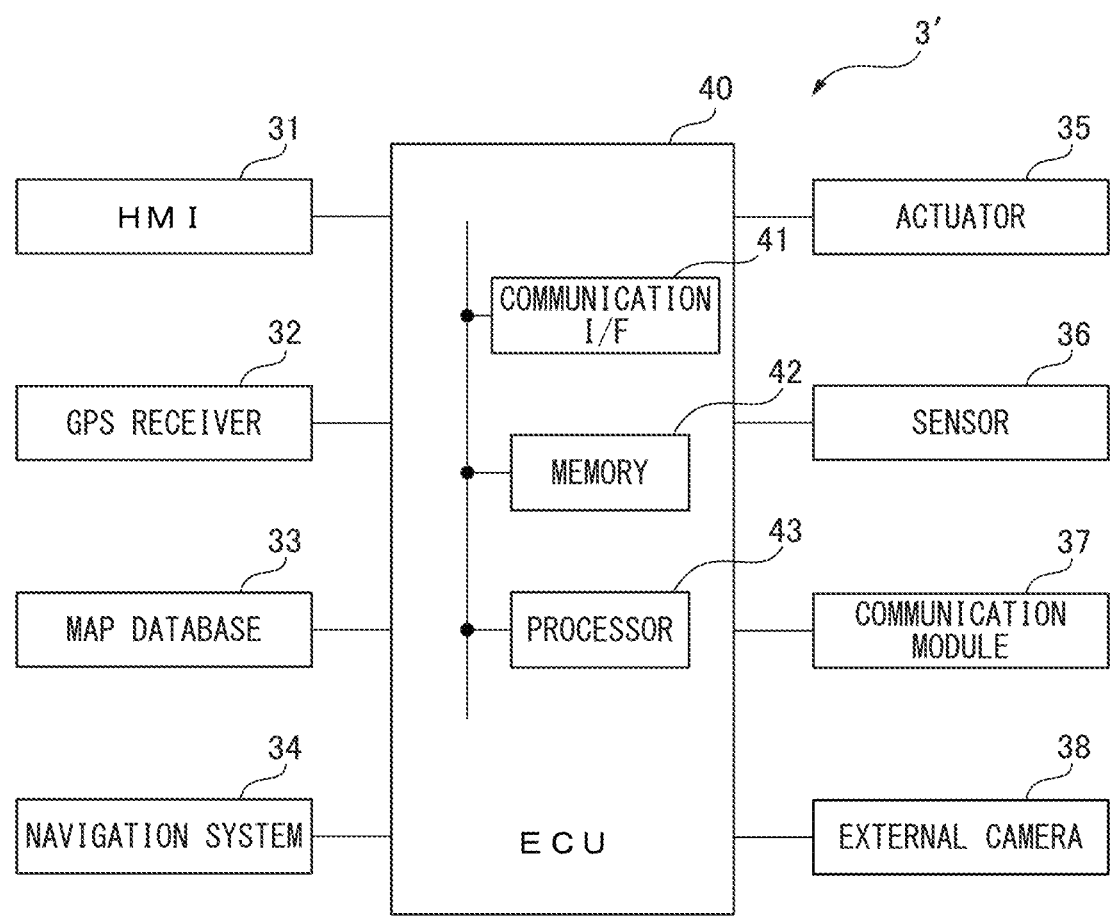
FIG. 7 is view schematically showing the configuration of a vehicle in which a machine learning device according to the second embodiment of the present disclosure is provided.

FIG. 7 is a view schematically showing the configuration of a vehicle 3' in which the machine learning device according to the second embodiment of the present disclosure is provided. As shown in FIG. 7, the vehicle 3' is further provided with an external camera 38. The external camera 38 captures the surroundings of the vehicle 3' and generates surrounding images of the vehicle 3'. For example, the external camera 38 is placed at the front of the vehicle 3' (for example, the back surface of the room mirror in the vehicle, the front bumper, etc.) so as to capture the area ahead of the vehicle 3'. Note that, the external camera 38 may be a stereo camera able to measure distance.

In the second embodiment, the vehicle 3' detects a disaster. That is, the training part 51 of the ECU 40 detects a disaster to acquire disaster information. For example, the training part 51 judges the presence of any disaster in the surroundings of the vehicle 3' based on surrounding images generated by the external camera 38. Specifically, the training part 51 uses image recognition techniques such as machine learning (neural networks, support vector machines, etc.,) to analyze the surrounding images and thereby judge the presence of any disaster. For example, the training part 51 judges that a disaster has occurred in the surroundings of the vehicle 3' if power cutoff of the traffic lights, collapse of buildings, fractures in the road surfaces, fallen trees, flooding of roads, avalanches, etc., are recognized from the surrounding images. Note that, the sensor 36 may include gyro sensor etc., and the training part 51 may detect disasters by detecting earthquakes by the sensor 36.

Figure 8:
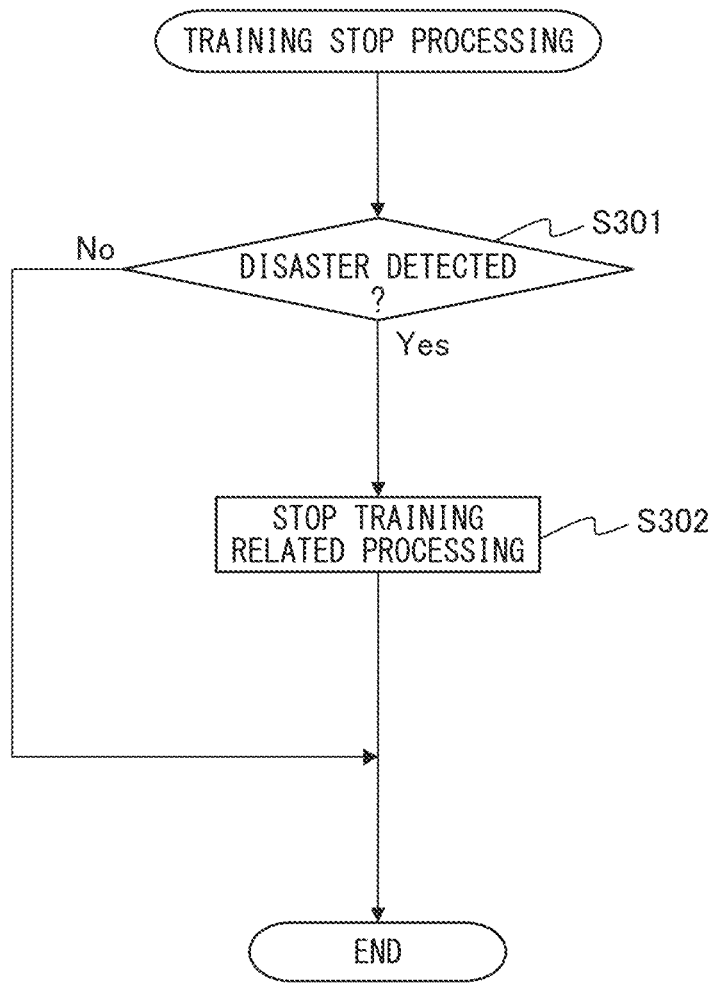
FIG. 8 is a flow chart showing a control routine of training stop processing in a second embodiment of the present disclosure.

FIG. 8 is a flow chart showing a control routine of training stop processing in the second embodiment of the present disclosure. The present control routine is repeatedly performed at predetermined intervals by the ECU 40 of the vehicle 3'.

First, at step S301, the training part 51 judges whether it has detected a disaster in the surroundings of the vehicle 3'. If it is judged that a disaster has not been detected, the present control routine ends. On the other hand, if it is judged that a disaster has been detected, the control routine proceeds to step S302.

At step S302, in the same way as step S202 of FIG. 6, the training part 51 stops the training related processing. After step S302, the present control routine ends. In this case, the training part 51, for example, resumes the training related processing when a predetermined time has elapsed, when the vehicle 3' is restarted, or when the driver of the vehicle 3' instructs resumption of the training related processing through the HMI 31. Note that, the control routine of FIG. 8 can be modified in the same way as the control routine of FIG. 6.

Third Embodiment

The configuration and control of the machine learning device according to the third embodiment are basically similar to the configuration and control of the machine learning device according to the first embodiment except for the points explained below. For this reason, below, the third embodiment of the present disclosure will be explained focusing on parts different from the first embodiment.

Figure 9:
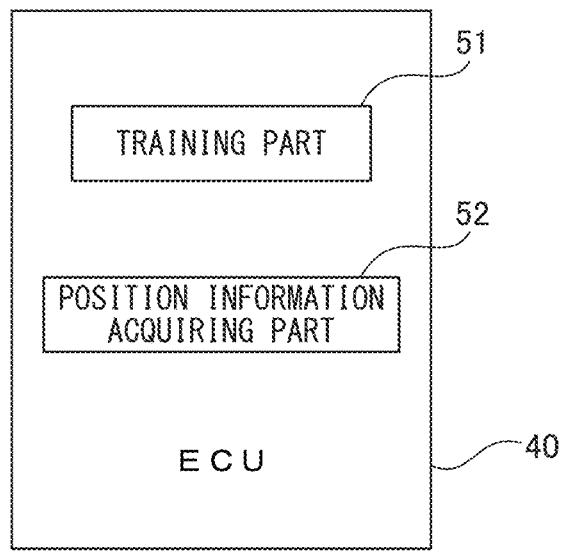
FIG. 9 is a functional block diagram of an ECU in a third embodiment.

FIG. 9 is a functional block diagram of an ECU 40 in the third embodiment. In the third embodiment, the ECU 40 has a position information acquiring part 52 in addition to a training part 51. The training part 51 and the position information acquiring part 52 are functional blocks realized by the processor 43 of the ECU 40 running programs stored in the memory 42 of the ECU 40.

The position information acquiring part 52 acquires position information of the vehicle 3. For example, the position information acquiring part 52 acquires the current position of the vehicle 3 based on the output of the GPS receiver 32. The position information of the vehicle 3 is periodically transmitted along with the identification information of the vehicle 3 (for example, the identification number) from the vehicle 3 to the server 2 and is stored in the storage device 22 of the server 2.

In this way, even if a disaster occurs, if the vehicle 3 is being driven through a location far from the disaster area, there is little need to supply electric power using the vehicle 3. For this reason, in the third embodiment, the training part 51 lowers the amount of electric power consumed in the training related processing when supply of electric power from the vehicle 3 is anticipated based on the disaster information and the position information of the vehicle 3 compared with when supply of electric power is not anticipated. By doing this, it is possible to decrease the amount of electric power consumed by the training related processing at a more suitable timing in preparation for supply of electric power at the time of a disaster.

For example, the server 2 receives disaster information from public institutions (Meteorological Agency, Ministry of Land, Infrastructure, Transport and Tourism, etc.), electric power companies, etc., and identifies a disaster area in which supply of electric power from the vehicle to the outside would be anticipated. Further, position information of a plurality of vehicles being driven is periodically sent to the server 2 and the server 2 compares the position information of the vehicles and disaster area to identify the vehicles inside the disaster area.

In a disaster area, in order to deal with power outages etc., supply of electric power from the vehicle to the outside is anticipated. For this reason, the server 2 transmits a stop command for training related processing to a vehicle in the disaster area. If the training part 51 of the ECU 40 receives a stop command of the training related processing from the server 2, the training part 51 stops the training related processing to thereby lower the amount of electric power consumed at the training related processing (make it zero).

Figure 10:
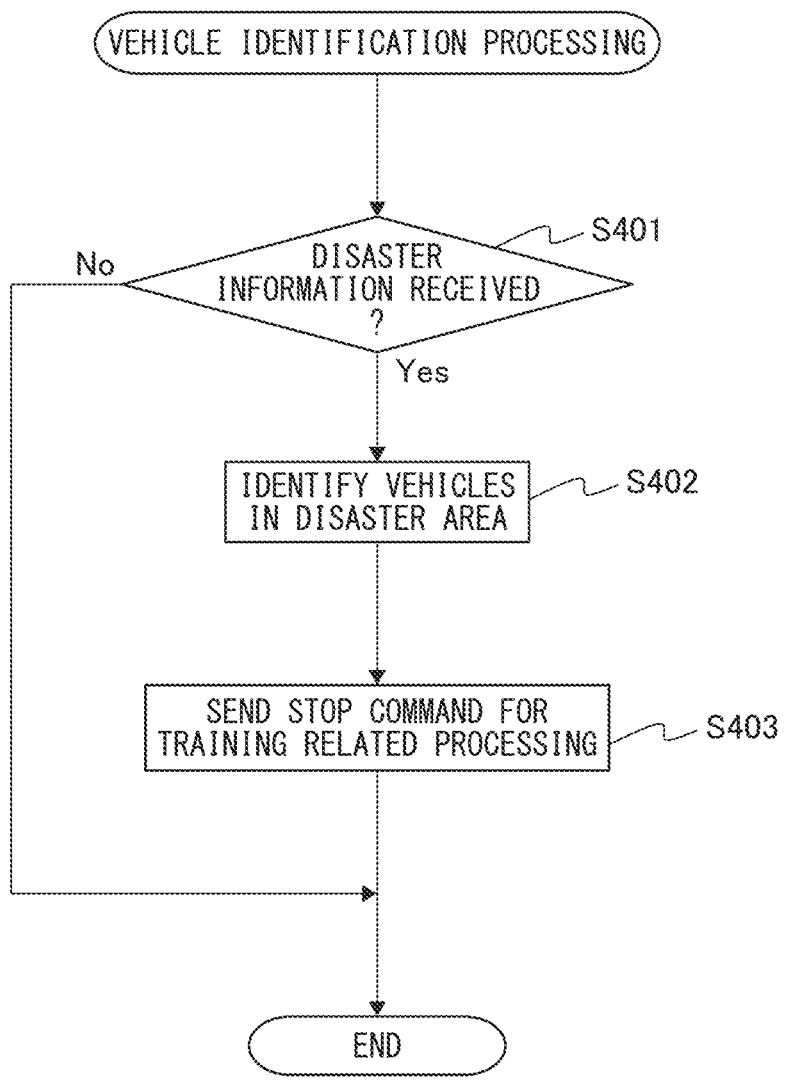
FIG. 10 is a flow chart showing a control routine of vehicle identification processing in the third embodiment of the present disclosure.

Below, using the flow charts of FIG. 10 and FIG. 11, the above-mentioned control will be explained. FIG. 10 is a flow chart showing the control routine of vehicle identification processing in the third embodiment of the present disclosure. The present control routine is repeatedly performed at predetermined intervals by the processor 24 of the server 2.

First, at step S401, the processor 24 judges whether it has received disaster information. If it is judged that the disaster information has not been received, the present control routine ends. On the other hand, if it is judged that the disaster information has been received, the control routine proceeds to step S402.

At step S402, the processor 24 identifies vehicles in the disaster area by comparing position information of the disaster area contained in the disaster information with position information of vehicles stored for every vehicle (current positions of vehicles).

Next, at step S403, the processor 24 transmits a stop command for training related processing to the vehicles identified at step S402. After step S403, the present control routine ends.

Note that, the disaster information may be input by the operator of the server 2 etc., to the server 2 and, at step S401, the processor 24 may judge whether disaster information has been input to the server 2.

Figure 11:
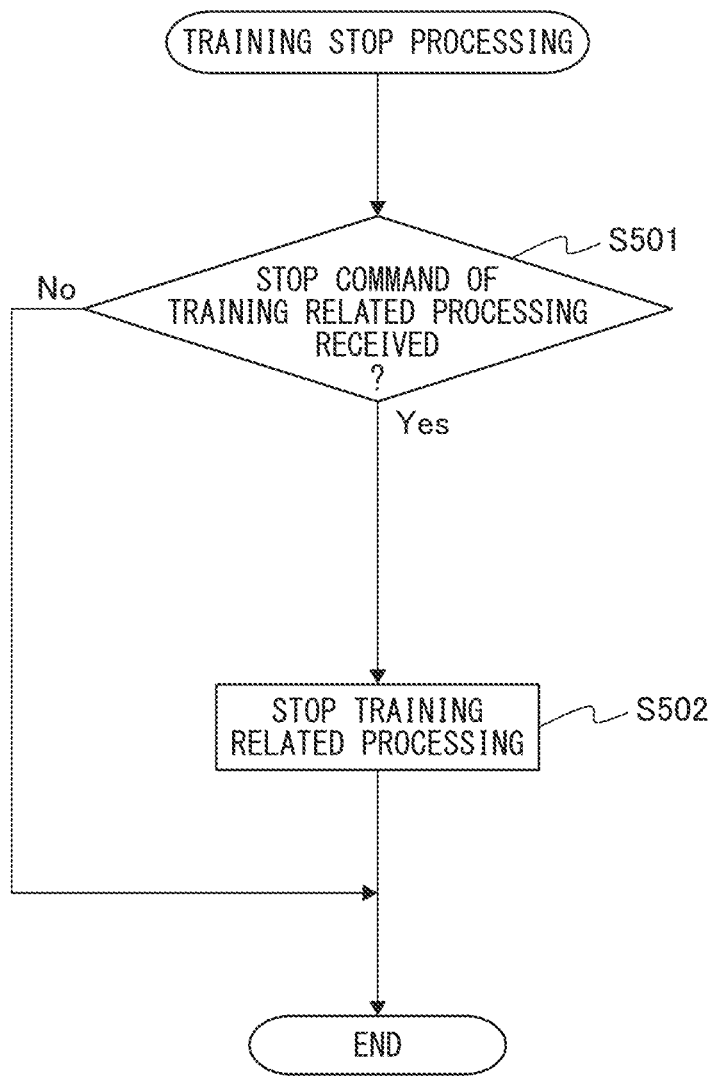
FIG. 11 is a flow chart showing a control routine of training stop processing in a third embodiment of the present disclosure.

FIG. 11 is a flow chart showing the control routine of training stop processing in the third embodiment of the present disclosure. The present control routine is repeatedly performed at predetermined intervals by the ECU 40 of each vehicle 3.

First, at step S501, the training part 51 judges whether a stop command of the training related processing has been received from the server 2. If it is judged that a stop command of the training related processing has not been received, the present control routine ends. On the other hand, if it is judged that a stop command of the training related processing has been received, the control routine proceeds to step S502.

At step S502, in the same way as step S202 of FIG. 6, the training part 51 stops the training related processing. After step S502, the present control routine ends. In this case, the training part 51, for example, resumes the training related processing when a predetermined time has elapsed, when the vehicle 3 is restarted, or when the driver of the vehicle 3 instructs resumption of the training related processing through the HMI 31.

Note that, since the amount of electric power consumed for training the neutral network model becomes the greatest among the training related processing, at step S502 the training part 51 may stop only the training of the neutral network model.

Further, the processor 24 of the server 2 may transmit a command to keep down the electric power instead of a training stop command to the vehicles in the disaster area. In this case, if a training part 51 receives a command to keep down the electric power from the server 2, it lowers the amount of electric power consumed in the training related processing without stopping the training related processing. For example, the training part 51 reduces the frequency of preparation of training data sets, reduces the frequency of training of the neutral network model, or slows down the training speed of the neutral network model.

Fourth Embodiment

The configuration and control of the machine learning device according to the fourth embodiment are basically similar to the configuration and control of the machine learning device according to the first embodiment except for the points explained below. For this reason, below, the fourth embodiment of the present disclosure will be explained focusing on parts different from the first embodiment.

In the fourth embodiment, instead of the server 2, each vehicle 3 is sent the disaster information and the training part 51 of the ECU 40 acquires the disaster information. That is, the training part 51 receives disaster information from public institutions (Meteorological Agency, Ministry of Land, Infrastructure, Transport and Tourism, etc.), electric power companies, etc., and identifies the disaster area in which supply of electric power from the vehicle to the outside would be anticipated. Note that, the training part 51 uses the communication module 37 to receive disaster information from other vehicles by vehicle-to-vehicle communication or receives disaster information from road side devices by road-to-vehicle communication.

Further, the training part 51 lowers the amount of electric power consumed in the training relating processing when the vehicle 3 is positioned inside a disaster area. Specifically, the training part 51 stops the training related processing when the vehicle 3 is positioned inside a disaster area.

Figure 12:
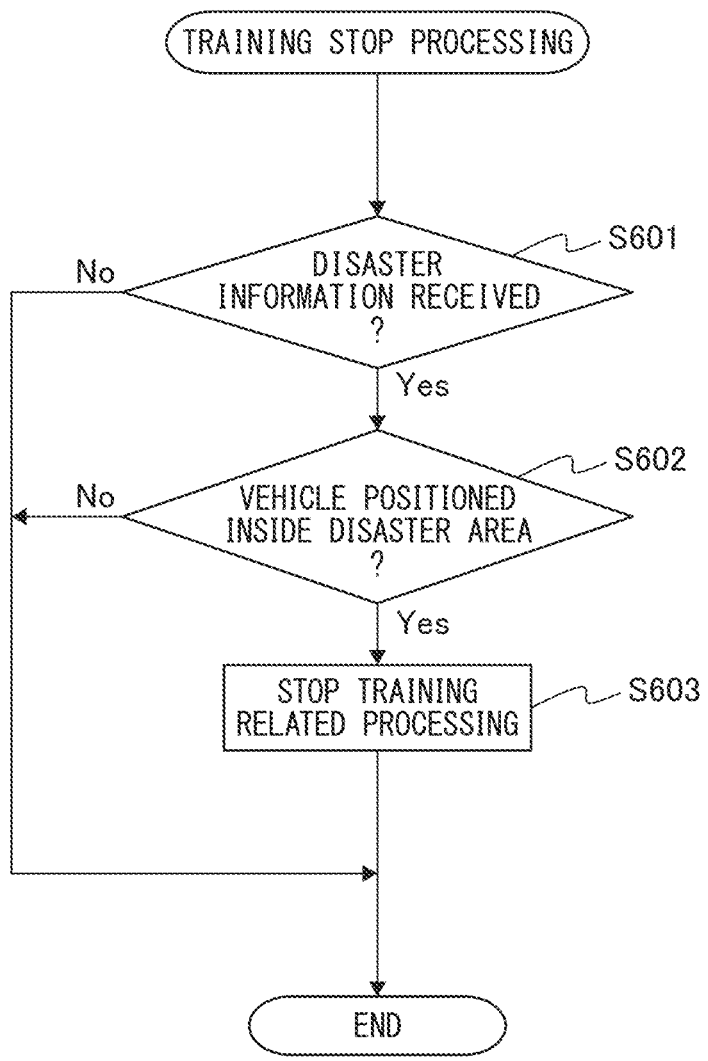
FIG. 12 is a flow chart showing a control routine of training stop processing in a fourth embodiment of the present disclosure.

FIG. 12 is a flow chart showing a control routine of training stop processing in the fourth embodiment of the present disclosure. The present control routine is repeatedly performed at predetermined intervals by the ECU 40 of the vehicle 3.

First, at step S601, the training part 51 judges whether disaster information has been received. If it is judged that disaster information has not been received, the present control routine ends. On the other hand, if it is judged that disaster information has been received, the control routine proceeds to step S602.

Next, at step S602, the training part 51 judges whether the vehicle 3 is positioned inside a disaster area based on the position information of the disaster area contained in the disaster information and the current position of the vehicle 3 acquired by the position information acquiring part 52. If it is judged that the vehicle 3 is not positioned in a disaster area, the present control routine ends. On the other hand, if it is judged that the vehicle 3 is positioned inside a disaster area, the control routine proceeds to step S603.

At step S603, in the same way as step S202 of FIG. 6, the training part 51 stops the training related processing. After step S603, the present control routine ends. In this case, the training part 51, for example, resumes the training related processing when a predetermined time has elapsed, when the vehicle 3 is restarted, or when the driver of the vehicle 3 instructs resumption of the training related processing through the HMI 31.

Note that, since the amount of electric power consumed for training the neutral network model becomes the greatest among the training related processing, at step S603 the training part 51 may stop only the training of the neutral network model.

Further, at step S603, the training part 51 may lower the amount of electric power consumed in the training related processing without stopping the training related processing. In this case, the training part 51, for example, reduces the frequency of preparation of training data sets, reduces the frequency of training of the neutral network model, or slows down the training speed of the neutral network model.

Fifth Embodiment

The configuration and control of the machine learning device according to the fifth embodiment are basically similar to the configuration and control of the machine learning device according to the first embodiment except for the points explained below. For this reason, below, the fifth embodiment of the present disclosure will be explained focusing on parts different from the first embodiment.

Figure 13:
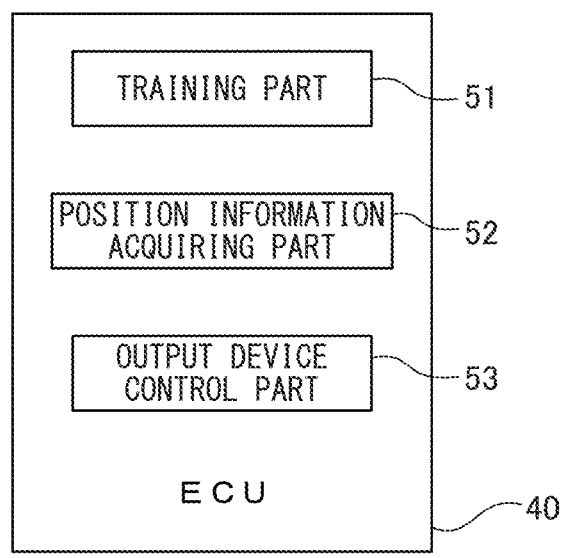
FIG. 13 is a functional block diagram of an ECU in a fifth embodiment.

FIG. 13 is a functional block diagram of the ECU 40 in the fifth embodiment. The ECU 40 has an output device control part 53 in addition to the training part 51 and the position information acquiring part 52. The training part 51, the position information acquiring part 52, and the output device control part 53 are functional blocks realized by the processor 43 of the ECU 40 running programs stored in the memory 42 of the ECU 40.

The output device control part 53 controls the output device provided at the vehicle 3. In the present embodiment, the output device control part 53 controls the HMI 31. The HMI 31 is one example of an output device.

As explained above, the training part 51 lowers the amount of electric power consumed in training related processing in preparation for supply of power to the outside of the vehicle 3 at the time of a disaster. However, a power outage does not always occur at a disaster area. Further, sometimes the driver will not want to supply power to the outside from the vehicle 3 at the time of a disaster.

Therefore, the output device control part 53 confirms permission to stop the training related processing with the driver of the vehicle 3 through the HMI 31. Further, when the driver permits the stopping of the training related processing, the training part 51 stops the training related processing, while when the driver does not permit the stopping of the training related processing, it does not stop the training related processing, whereby it is possible to stop the training related processing based on the intent of the driver in preparation for supply of electric power at the time of a disaster.

In the fifth embodiment, the control routine of disaster information transmission processing shown in FIG. 5 is performed in the same way as the first embodiment, and the control routine of the training stop processing shown in FIG. 14 is performed. FIG. 14 is a flow chart showing the control routine of the training stop processing in the fifth embodiment of the present disclosure. The present control routine is repeatedly performed at predetermined intervals by the ECU 40 of the vehicle 3.

First, at step S701, the output device control part 53 judges whether disaster information has been received from the server 2. If it is judged that disaster information has not been received from the server 2, the present control routine ends. On the other hand, if it is judged that disaster information has been received from the server 2, the control routine proceeds to step S702.

At step S702, the output device control part 53 confirms permission to stop the training related processing with the driver of the vehicle 3 through the HMI 31. For example, the output device control part 53 confirms permission with the driver by text or voice through the HMI 31.

Next, at step S703, the training part 51 judges whether the driver has permitted stopping of the training related processing based on input to the HMI 31 by the driver. If it is judged that the driver has not permitted stopping of the training related processing, the present control routine ends. On the other hand, if it is judged that the driver permitted stopping of the training related processing, the control routine proceeds to step S704.

At step S704, in the same way as step S202 of FIG. 6, the training part 51 stops the training related processing. After step S704, the present control routine ends. In this case, the training part 51, for example, resumes the training related processing when a predetermined time has elapsed, when the vehicle 3 is restarted, when the driver of the vehicle 3 instructs resumption of the training related processing through the HMI 31, or when the server 2 instructs resumption of the training related processing. Note that, the control routine of FIG. 14 can be modified in the same way as the control routine of FIG. 6.

Sixth Embodiment

The configuration and control of the machine learning device according to the sixth embodiment are basically similar to the configuration and control of the machine learning device according to the third embodiment except for the points explained below. For this reason, below, the sixth embodiment of the present disclosure will be explained focusing on parts different from the third embodiment.

As explained above, in the third embodiment, in a vehicle inside a disaster area, the amount of electric power consumed in the training related processing is lowered. On the other hand, even if a vehicle is not positioned in a disaster area when a disaster occurs, sometimes the destination of the vehicle will be the disaster area. In this case, it may be considered to supply electric power from the vehicle to the outside after arriving at the disaster area. For this reason, in the sixth embodiment, the training part 51 lowers the amount of electric power consumed in training related processing when supply of electric power from the vehicle 3 to the outside is anticipated based on the disaster information and destination of the vehicle 3 compared to when supply of electric power is not anticipated. By doing this, it is possible to keep down the electric power consumed in a suitable vehicle considering the destination.

The destination of the vehicle 3 is input by the driver of the vehicle 3 and is stored in for example the navigation system 34 etc. The position information acquiring part 52 acquires the stored destination of the vehicle 3. The destination of the vehicle 3 is transmitted together with the identification information of the vehicle 3 (for example, the identification number) from the vehicle 3 to the server 2 and is stored in the storage device 22 of the server 2.

In the sixth embodiment, the control routine of the vehicle identification processing shown in FIG. 15 is performed, and in the same way as the third embodiment, the control routine of the training stop processing of FIG. 11 is performed. FIG. 15 is a flow chart showing the control routine of the vehicle identification processing in the sixth embodiment of the present disclosure. The present control routine is repeatedly performed at predetermined intervals by the processor 24 of the server 2.

First, at step S801, the processor 24 judges whether it has received disaster information. When it is judged that disaster information has not been received, the present control routine ends. On the other hand, when it is judged that disaster information has been received, the control routine proceeds to step S802.

At step S802, the processor 24 compares the position information of the disaster area included in the disaster information with the destination of the vehicle stored for each vehicle to identify a vehicle with the disaster area as its destination.

Next, at step S803, the processor 24 transmits a stop command for the training related processing to the vehicle identified at step S802. After step S803, the present control routine ends.

Note that, the disaster information may be input by the operator of the server 2 etc., to the server 2 and, at step S801, the processor 24 may judge whether disaster information has been input to the server 2. Further, at step S803, the processor 24 may transmit a command to keep down the electric power instead of a command to stop training to a vehicle having the disaster area as its destinations. Further, the current location and destination of each vehicle may be periodically transmitted to the server 2 and the processor 24 may transmit a stop command of the training relating processing or a command to keep down the electric power to a vehicle inside the disaster area and a vehicle having the disaster area as its destination.

Seventh Embodiment

The configuration and control of the machine learning device according to the seventh embodiment are basically similar to the configuration and control of the machine learning device according to the first embodiment except for the points explained below. For this reason, below, the seventh embodiment of the present disclosure will be explained focusing on parts different from the first embodiment.

In the seventh embodiment, the neural network model is trained in the server 2 instead of the ECU 40 of the vehicle 3. That is, the server 2 functions as a machine learning device.

The training data sets used for training the neutral network model are prepared in a plurality of vehicles and are transmitted from the plurality of vehicles to the server 2. The processor 24 of the server 2 uses the large number of training data sets to train the neutral network model and transmits the trained neural network model through the communication interface 21 to the vehicles. At this time, at the vehicles 3, electric power is consumed when receiving the trained neutral network model from the server 2 and storing it.

For this reason, when the processor 24 of the server 2 acquires disaster information, it stops transmitting the trained neutral network model to the vehicles 3. Due to this, at the vehicles 3, it is possible to keep down the decrease of the amount of electric power which can be supplied from a vehicle 3 to the outside at the time of a disaster.

FIG. 16 is a flow chart showing a control routine of model transmission stop processing in the seventh embodiment of the present disclosure. The present control routine is repeatedly performed at predetermined intervals by the processor 24 of the server 2.

First, at step S901, the processor 24 judges whether disaster information has been received. If it is judged that disaster information has not been received, the present control routine ends. On the other hand, if it is judged that disaster information has been received, the control routine proceeds to step S902.

At step S902, the processor 24 stops transmitting the trained neutral network model to the vehicles 3. After step S902, the present control routine ends. In this case, the processor 24, for example, resumes transmission of the trained neutral network model when a predetermined time has elapsed or when the state of disaster is ended.

Note that, disaster information may be input by the operator of the server 2 etc., to the server 2 and, at step S901, the processor 24 may judge whether the disaster information has been input to the server 2.

Further, step S402 of FIG. 10 may be performed between steps S901 and S902, and, at step S902, the processor 24 may stop transmitting the trained neural network model to vehicles identified at step S402. Similarly, step S802 of FIG. 15 may be performed between steps S901 and S902 and, at step S902, the processor 24 may stop transmitting the trained neural network model to vehicles identified at step S802.

Further, in the seventh embodiment, like in the above embodiments, control may be performed for stopping the training related processing at each vehicle 3 or control may be performed to lower the amount of electric power consumed in training related processing at each vehicle 3. In this case, when stopping the training related processing, each training part 51 stops preparing training data sets and transmitting training data sets to the server 2 while when lowering the amount of electric power consumed by the training related processing, reduces the frequency of preparation of training data sets or reduces the frequency of transmission of training data sets to the server 2.

OTHER EMBODIMENTS

Above, preferred embodiments according to the present disclosure were explained, but the present disclosure is not limited to these embodiments and can be corrected and changed in various ways within the language of the claims.

For example, as the input parameters and output parameters of the neutral network model, it is possible to use various parameters corresponding to what is covered by the neutral network model (internal combustion engine, motor, battery, etc.) The sensors for detecting measured values of the input parameters or output parameters are selected in accordance with the types of the input parameters and output parameters.

Further, as the machine learning model trained in the vehicle 3 or the server 2, a random forest regression, "k" nearest neighbor algorithm, support vector machine, or other machine learning model other than a neural network may be used.

Further, the above embodiments can be worked combined in any way. For example, if the second embodiment and the fifth embodiment are combined, in the control routine of the training stop processing of FIG. 8, instead of step S302, steps S702 to S704 of FIG. 14 are performed. Further, if the third embodiment and the fifth embodiment are combined, in the control routine of the training stop processing of FIG. 11, instead of step S502, steps S702 to S704 of FIG. 14 are performed. Further, if the fourth embodiment and the fifth embodiment are combined, in the control routine of the training stop processing of FIG. 12, instead of step S603, steps S702 to S704 of FIG. 14 are performed.

Further, if the fourth embodiment and the sixth embodiment are combined, at step S602 of the control routine of the training stop processing of FIG. 12, the training part 51 judges whether the destination of the vehicle 3 is a disaster area. Further, if the fifth embodiment and the sixth embodiment are combined, when the control routine of the vehicle identification processing of FIG. 15 in the sixth embodiment and the control routine of the training stop processing of FIG. 11 are performed, instead of step S502 of FIG. 11, steps S702 to S704 of FIG. 14 are performed.

REFERENCE SIGNS LIST 2 server
21 communication interface
24 processor
3 vehicle
40 ECU
51 training part

The invention claimed is:

1. A machine learning device provided in a vehicle configured to supply electric power to an outside of the vehicle, the machine learning device comprising:
    a processor configured to perform processing relating to training a machine learning model in the vehicle, wherein
    the processor is configured to
      in response to acquiring no disaster information, consume a first electric power consumption amount in the processing relating to training, and
      in response to acquiring the disaster information, lower an electric power consumption amount in the processing relating to training from the first electric power consumption amount to a second electric power consumption amount, and
    the processor is configured to
      acquire position information of the vehicle, and
      in response to supply of electric power from the vehicle to the outside being anticipated based on the disaster information and the position information, lower the electric power consumption amount in the processing relating to training from the first electric power consumption amount to the second electric power consumption amount.

2. The machine learning device according to claim 1, wherein
    the processor is configured to acquire a destination of the vehicle, and
    the processor is configured to, in response to supply of electric power from the vehicle to the outside being anticipated based on the disaster information and the destination, lower the electric power consumption amount in the processing relating to training from the first electric power consumption amount to the second electric power consumption amount.

3. The machine learning device according to claim 1, wherein
the processor is configured to lower the electric power consumption amount from the first electric power consumption amount to the second electric power consumption amount by stopping the processing relating to training.

4. The machine learning device according to claim 3, wherein
the processor is configured to control an output device provided at the vehicle,
the processor is configured to confirm permission for stopping the processing relating to training with the driver of the vehicle through the output device, and
the processor is configured to, in response to the driver not permitting stopping of the processing relating to training, not stop the processing relating to training.

5. The machine learning device according to claim 1, wherein
the processor is configured to lower the electric power consumption amount in the processing relating to training from the first electric power consumption amount to the second electric power consumption amount by stopping (i) a preparation of training data sets for training of the machine learning model or (ii) the training of the machine learning model.

6. The machine learning device according to claim 5, wherein
the processor is further configured to acquire the disaster information from an external camera configured to capture surroundings of the vehicle.

7. The machine learning device according to claim 1, wherein
the processor is configured to lower the electric power consumption amount in the processing relating to training from the first electric power consumption amount to the second electric power consumption amount by (i) reducing a frequency of preparation of training data sets for training of the machine learning model, (ii) reducing a frequency of the training of the machine learning model, or (iii) slowing down training speed of the training of the machine learning model.

* * * * *